(12) United States Patent
Gulleen et al.

(10) Patent No.: US 9,803,774 B2
(45) Date of Patent: Oct. 31, 2017

(54) FLOW CONTROL VALVE HAVING A MOTION CONVERSION DEVICE

(71) Applicant: FISHER CONTROLS INTERNATIONAL LLC, Marshalltown, IA (US)

(72) Inventors: Matthew Lawrence Gulleen, Marshalltown, IA (US); Elliot James Hoff, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 84 days.

(21) Appl. No.: 14/874,199

(22) Filed: Oct. 2, 2015

(65) Prior Publication Data

US 2017/0097105 A1    Apr. 6, 2017

(51) Int. Cl.
| | |
|---|---|
| *F16K 31/122* | (2006.01) |
| *F15B 7/06* | (2006.01) |
| *F16K 1/12* | (2006.01) |

(52) U.S. Cl.
CPC ............ *F16K 31/1225* (2013.01); *F15B 7/06* (2013.01); *F16K 1/126* (2013.01)

(58) Field of Classification Search
CPC .... F16K 31/1225; F16K 31/163; F16K 1/126; F16K 1/122; F15B 7/06
USPC .............. 251/31, 26, 27, 28, 29; 137/85, 86
See application file for complete search history.

(56) References Cited

U.S. PATENT DOCUMENTS

| | | | | |
|---|---|---|---|---|
| 3,038,692 A | * | 6/1962 | Holmes | F16K 3/14 251/167 |
| 3,099,287 A | * | 7/1963 | Manor | F15B 15/065 137/456 |
| 3,858,844 A | * | 1/1975 | Lewis | F01D 17/145 251/28 |
| 4,872,310 A | * | 10/1989 | Kaye | F15B 7/005 60/567 |
| 6,338,286 B1 | * | 1/2002 | Skogward | F15B 7/005 60/591 |
| 8,740,176 B2 | * | 6/2014 | Zeng | F16K 31/1225 137/219 |

* cited by examiner

*Primary Examiner* — Jessica Cahill
*Assistant Examiner* — Ian Paquette
(74) *Attorney, Agent, or Firm* — Marshall, Gerstein & Borun LLP (57) ABSTRACT

A motion conversion device is disclosed for converting motion in one direction into motion in another direction. The motion conversion device may include a single-acting cylinder hydraulically or pneumatically coupled to a double-acting cylinder such that movement of the single-acting cylinder along an axis causes movement of the double-acting cylinder along a non-parallel axis. The single-acting cylinder may be mechanically coupled to another single-acting cylinder such that movement of one of the single-acting cylinders in a direction causes movement of the other one of the single-acting cylinders in an opposite direction. In this way, the single-acting cylinders may cooperate to provide reciprocal motion of the double-acting cylinder. Also disclosed is a valve incorporating a motion conversion device for the purpose of moving a closure member between an open position and a closed position. Furthermore, a method for operating a valve closure member with a motion conversion device is disclosed.

19 Claims, 8 Drawing Sheets

FLOW CONTROL VALVE HAVING A MOTION CONVERSION DEVICE

FIELD OF DISCLOSURE

The present disclosure generally relates to motion conversion devices, and more particularly, to motion conversion devices for use in flow control valves having a closure member which moves along an axis that is non-parallel to an output force provided by an actuator.

BACKGROUND

Commercial and industrial processes commonly use a system of control valves to control the flow of a process fluid through a process plant. Many process control valves, including threaded internal valves, regulators, or other control devices, require actuators to position a flow control element inside the valve in a desired position. The control element, in turn, controls the flow of a process fluid through the valve. In many applications, the actuator is mounted directly to the valve body and connects to a valve stem, which in turn is operatively coupled to the flow control element (e.g., a closure member). Depending on the type of valve, the valve actuator either rotates the valve stem or moves the valve stem in a linear direction.

In various applications, valve designers may desire to convert one type of motion into another type of motion. For example, some applications require the conversion of translational movement in one direction into translational movement in another direction. An example of one such application is an axial flow valve which requires movement generated by a power source external to a flow passage to be converted into axial movement of a component inside the flow passage. Still other examples are known in the industry.

Figure 1:
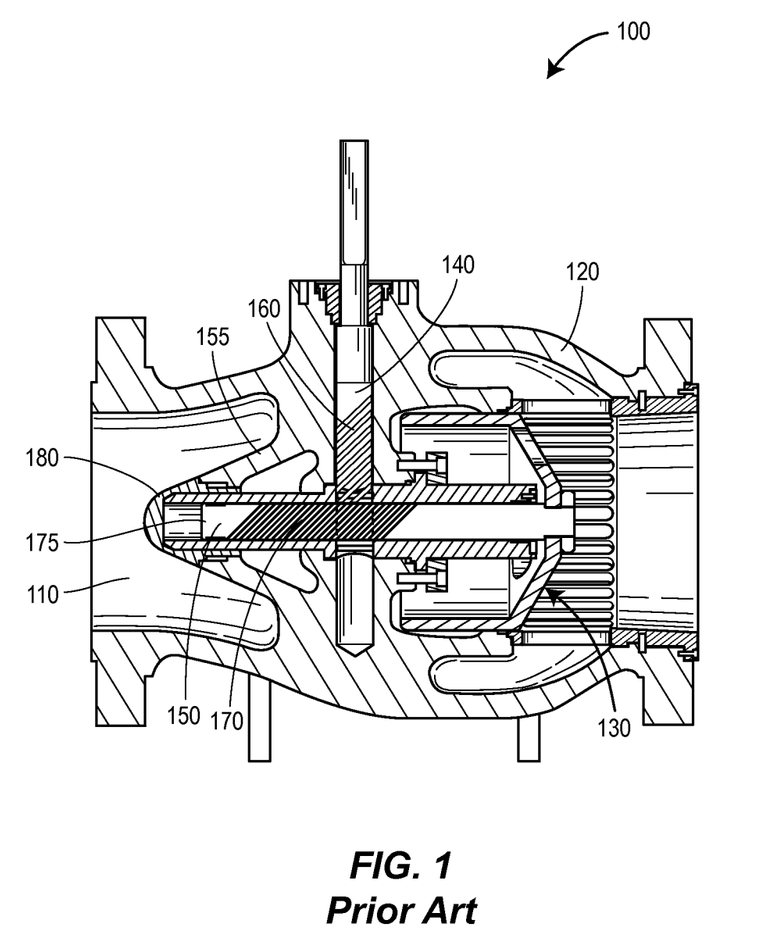
FIG. 1 depicts a cross-sectional view of a known axial flow valve 100 incorporating a drive rack 140.

FIG. 1 illustrates an example of a known axial flow valve 100. The axial flow valve 100 includes a flow passage 110 extending through a valve body 120. A closure member 130 is positioned inside the flow passage 110 to selectively open and close the flow passage 110. The closure member 130 is movable along a central axis of the flow passage 110 between a closed position preventing fluid flow through the flow passage 110 and an open position permitting fluid flow through the flow passage 110. Axial movement of the closure member 130 is provided by the interaction of a drive linear rack 140 and a driven linear rack 150 located within the flow passage 110. A housing 155 protects the drive rack 140 and the driven linear rack 150 from the fluid flowing through the flow passage 110. The drive rack 140 is moved by a linear actuator (not shown) external to flow passage 110. Gear teeth 160 of the drive rack 140 meshingly engages gear teeth 170 of the driven linear rack 150. Linear motion of the drive rack 140 causes the driven linear rack 150 to move along the axial direction.

Positioning the closure member 130 in the open position of FIG. 1 requires moving a rear end 175 of the driven linear rack 150 away from the drive rack 140. An enlarged rear end 180 of the housing 155 is needed to accommodate the rear end 175 of the driven linear rack 150 in this position. The enlarged rear end 180 of the housing 155 impacts the fluid flow in the flow passage 110 and also increases the costs and complexity of manufacturing the housing 155 and/or the valve body 120. Another consequence of the arrangement shown in FIG. 1 is that axial motion is lost to the racks 160, 170, and the friction created in this arrangement causes a need for larger linear actuators. As such, the lengths of the racks 140, 150 are extended in order to achieve the desired travel distance of the closure member 130. This further increases the size of the housing 155 and the valve body 120.

SUMMARY

In accordance with a first exemplary aspect, a valve includes a valve body having a flow passage and a closure member movable between a closed position preventing fluid flow through the flow passage and an open position permitting fluid flow through the flow passage. The valve also includes a first bore in fluid communication with a second bore, and a third bore in fluid communication with the second bore. A first single-acting cylinder is movable within the first bore along a first axis. A double-acting cylinder is coupled to the closure member and movable within the second bore along a second axis. A second single-acting cylinder is movable within the third bore along a third axis. The second axis is non-parallel to the first axis and the third axis. The first single-acting cylinder is configured to exert hydraulic or pneumatic pressure on a side of the double-acting cylinder to move the double-acting cylinder along the second axis in a direction that moves the closure member to one of the closed position and the open position. The second single-acting cylinder is configured to exert hydraulic or pneumatic pressure on an opposite side of the double-acting cylinder to move the double-acting cylinder along the second axis in an opposite direction that moves the closure member to the other one of the closed position and the open position.

In accordance with a second exemplary aspect, a motion conversion device for use with a control valve is disclosed. The motion conversion device includes a first bore in fluid communication with a second bore, a first hydraulic cylinder movable within the first bore along a first axis, and a second hydraulic cylinder movable within the second bore along a second axis. The first axis is non-parallel to the second axis. The first hydraulic cylinder is hydraulically coupled to the second hydraulic cylinder such that movement of the first hydraulic cylinder along the first axis causes movement of the second hydraulic cylinder along the second axis. A third bore is in fluid communication with the second bore. A third hydraulic cylinder is movable within the third bore along a third axis. The third hydraulic cylinder being hydraulically coupled to the second hydraulic cylinder and mechanically coupled to the first hydraulic cylinder.

In accordance with a third exemplary aspect, a method for operating a valve is disclosed. The method includes moving a first single-acting cylinder along a first axis to exert hydraulic or pneumatic pressure on a side of a double-acting cylinder to move the double-acting cylinder along a second axis to close the valve. The method also includes moving a second single-acting cylinder along a third axis to exert hydraulic or pneumatic pressure on an opposite side of the double-acting cylinder to move the double-acting cylinder along the second axis to open the valve. The second axis is non-parallel to the first axis and the third axis.

In further accordance with any one or more of the foregoing first, second or third aspects, the valve, the motion conversion device and/or the method may further include any one or more of the following preferred forms.

In one preferred form, the first single-acting cylinder is mechanically coupled to the second single-acting cylinder such that: (i) movement of the first single-acting cylinder toward the second axis causes movement of the second single-acting cylinder away from the second bore, and (ii) movement of the first single-acting cylinder away from the second bore causes movement of the second single-acting cylinder toward the second axis.

In another preferred form, the first single-acting cylinder is mechanically coupled to the second single-acting cylinder by at least one rotatable link member.

In another preferred form, the third bore includes a first end in fluid communication with the second bore and a second end vented to the atmosphere.

In another preferred form, a slot is formed in the first single-acting cylinder and configured to slidably receive an end of the at least one rotatable link member.

In another preferred form, the at least one rotatable link member has a rotational axis arranged between the first axis and the third axis.

In another preferred form, the double-acting cylinder includes a piston and a rod, the rod extending between the piston and the closure member; and the first bore is in fluid communication with a first end of the second bore, the third bore is in fluid communication with a second end of the second bore, and the piston of the double-acting cylinder is arranged between the first and second ends of the second bore.

In another preferred form, the first axis is parallel to the third axis.

In another preferred form, an actuator is configured to move the first single-acting cylinder along the first axis.

In another preferred form, the first hydraulic cylinder is mechanically coupled to the third hydraulic cylinder such that: (i) movement of the first hydraulic cylinder toward the second axis causes movement of the third hydraulic cylinder away from the second bore, and (ii) movement of the first hydraulic cylinder away from the second bore causes movement of the third hydraulic cylinder toward the second axis.

In another preferred form, the first hydraulic cylinder is mechanically coupled to the third hydraulic cylinder by at least one rotatable link member.

In another preferred form, the at least one rotatable link member has a rotational axis arranged between the first axis and the third axis.

In another preferred form, a slot is formed in the first hydraulic cylinder and is configured to slidably receive an end of the at least one rotatable link member.

In another preferred form, the third bore includes a first end in fluid communication with the second bore and a second end vented to the atmosphere.

In another preferred form, the first axis is parallel to the third axis.

In another preferred form, the first single-acting cylinder is mechanically coupled to the second single-acting cylinder such that moving the first single-acting cylinder in a direction causes the second single-acting cylinder to move in an opposite direction.

In another preferred form, the first single-acting cylinder is mechanically coupled to the second single-acting cylinder by a rotatable link member.

DETAILED DESCRIPTION

The present disclosure generally relates to devices and methods for converting movement in one direction into movement in another direction. As described below in more detail, the conversion can be accomplished through a variety of hydraulic and/or mechanical couplings, and may involve closed hydraulic circuits and/or vented hydraulic circuits. The motion conversion devices and methods disclosed herein can be implemented in a variety of applications where the force provided by a drive member, such as an actuator, is not aligned with the path of movement a driven member, such as a valve closure member. The following description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

Figure 2A:
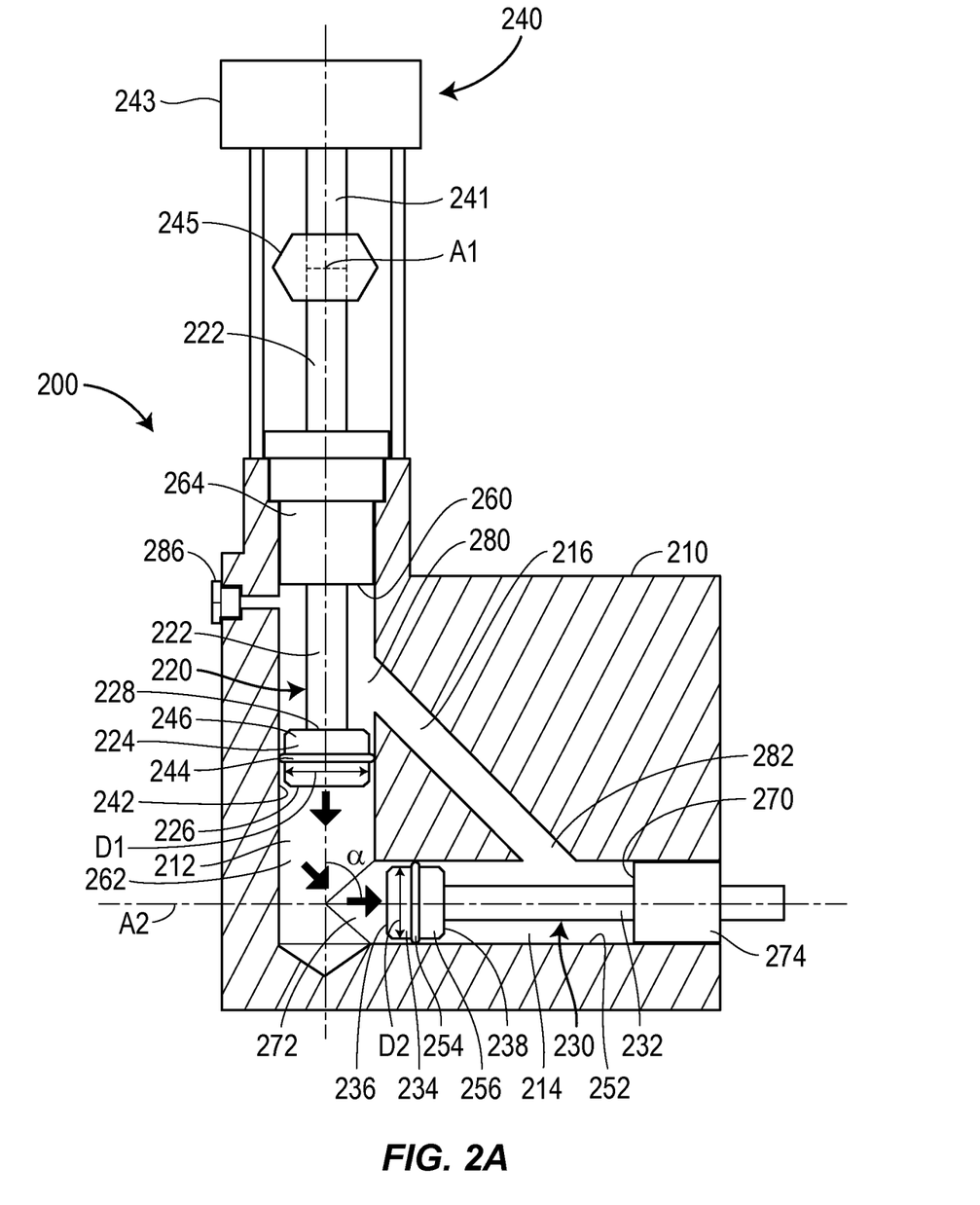
FIG. 2A illustrates a motion conversion device 200 during a ram down operation.
Figure 2B:
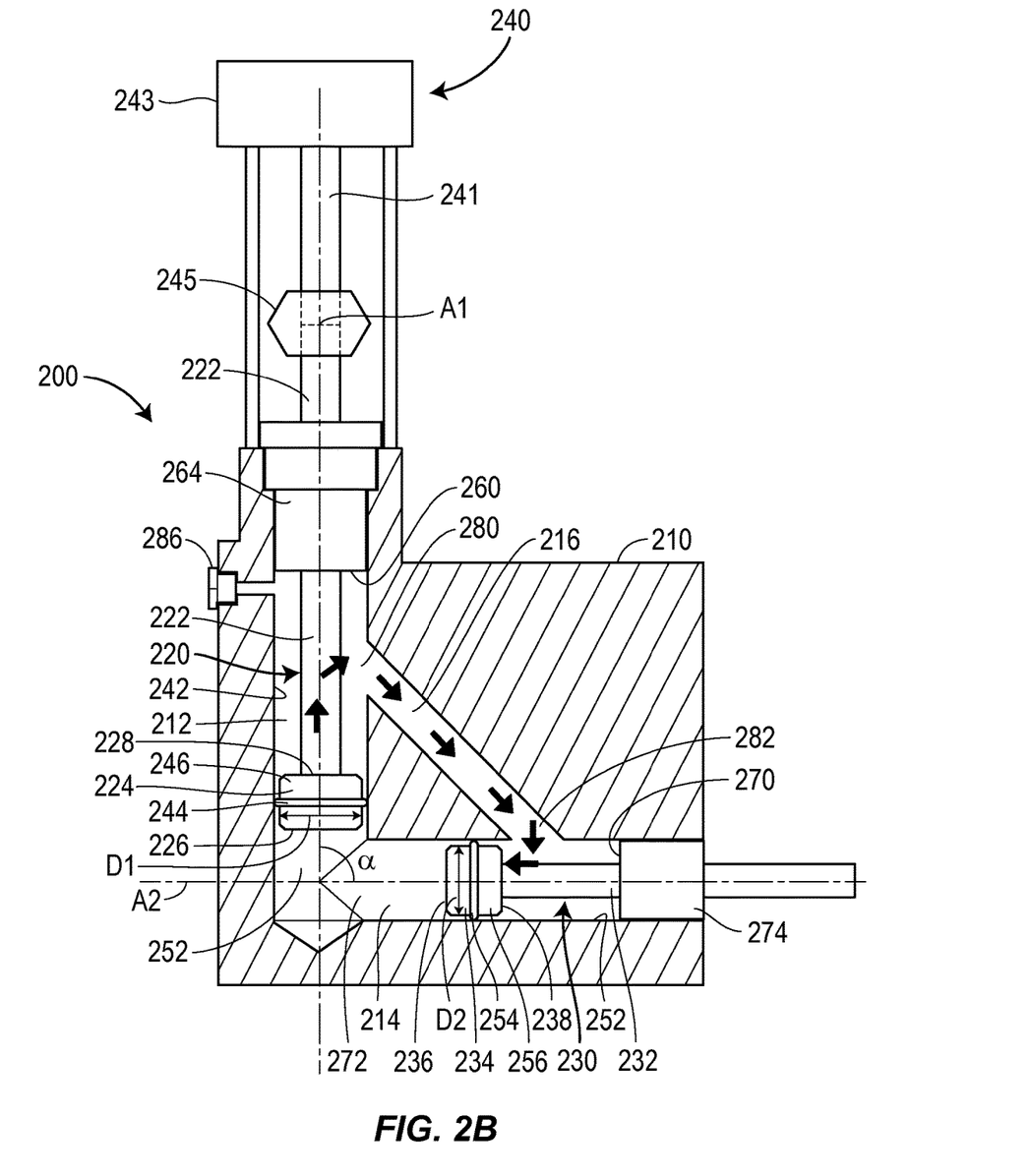
FIG. 2B shows the motion conversion 200 device during a ram up operation.

Referring now to the drawings, FIGS. 2A and 2B depict a motion conversion device 200 according to one exemplary embodiment. The motion conversion device 200 converts translational movement along a first axis A1 into translational movement along a second axis A2. The motion conversion device 200 includes a body 210 with a first bore 212, a second bore 214 and a third bore 216. The bores 212, 214 and 216 are in fluid communication with each other and form a closed circuit. A first double-acting cylinder 220 is positioned in the first bore 212 and a second double-acting cylinder 230 is positioned in the second bore 214. The first double-acting cylinder 220 moves along the first axis A1, and the second double-acting cylinder 230 moves along the second axis A2. The first double-acting cylinder 220 is driven along the first axis A1 by an actuator 240. A liquid (e.g., a hydraulic liquid) or gas fills the first, second and third bores 212, 214 and 216. The first double-acting cylinder 220 acts as a ram that pushes the liquid or gas against the second double-acting cylinder 230 and thereby causes the second double-acting cylinder 230 to move along the second axis A2.

The first double-acting cylinder 220 includes a first rod 222 aligned along the first axis A1 and a first piston 224. The first rod 222 and the first piston 224 may be formed in one piece or formed as separate components attached by a threaded connection, for example. The first piston 224 may be cylindrically-shaped and possess a diameter of D1. The piston 224 possesses first and second end surfaces 226, 228 facing in opposite directions. The first end surface 226 pushes the liquid or gas in the first bore 212 when the first double-acting cylinder 220 is driven by the linear actuator 240 in the downward direction as shown in FIG. 2A. The second end surface 228 of the first piston 224 pushes the liquid or gas in the first bore 212 when the first double-acting cylinder 220 is driven by the linear actuator 240 in the upward direction as shown in FIG. 2B. The cylinder 220 is a double-acting cylinder because the cylinder 220 employs the first and second end surfaces 226, 228 to push the liquid or gas in the first bore 212 in opposite directions.

The first piston 224 sealingly and slidably engages a circumferential surface 242 of the first bore 212. This is accomplished by, for example, an O-ring 244 wrapped around a circumferential surface 246 of the first piston 224. The circumferential surface 246 may include an annular groove for holding the O-ring 244. In one embodiment, the first piston 224 includes multiple O-rings 244 positioned in multiple, respective annular grooves. The O-ring 244 inhibits the passage of liquid or gas around the first piston 224. This enables the first piston 224 to create a positive pressure on one side of the first piston 224 and a negative pressure on the other side of the first piston 224, and vice versa.

The second double-acting cylinder 230 is configured in a similar manner as the first double-acting cylinder 220. The second double-acting cylinder 230 includes a first rod 232 aligned along the second axis A2 and a second piston 234. The first rod 232 and the second piston 234 may be attached, for example, by a threaded connection or they can be formed in one piece as a unitary structure. The second piston 234 may possess a cylindrical shape and have a diameter of D2. Opposite ends of the second piston 234 include first and second end surfaces 236, 238. The first end surface 236 is pushed by the liquid or gas in the second bore 214 when the first double-acting cylinder 230 is driven in the downward direction as shown in FIG. 2A. The second end surface 238 is pushed by the liquid or gas in the second bore 214 when the first double-acting cylinder 230 is driven in the upward direction in the manner shown in FIG. 2B. The first double-acting cylinder 230 is a double-acting cylinder because the first and second end surfaces 236, 238 allow the first double-acting cylinder 230 to be pushed in opposite directions.

The second piston 234 sealingly and slidably engages a circumferential surface 252 of the second bore 214. An O-ring 254 may be provided to sealingly and slidably engage the second piston 234 and the circumferential surface 252 of the second bore 214. The O-ring 254 may be positioned in an annular groove in a circumferential surface 256 of the second piston 234. In one embodiment, the second piston 234 includes multiple annular grooves, each holding a respective O-ring 254. The O-ring inhibits the passage of liquid or gas around the second piston 234, and thereby allows a pressure differential to exist across the second piston 234.

The first, second and third bores 212, 214, 216 illustrated in FIGS. 2A and 2B are machined from or cast into a block of material (i.e., the body 210). In one embodiment, the bores 212, 214, 216 are formed in separate components. The first bore 212 includes a closed end 260 and an open end 262. The closed end 260 may be formed by a portion of the body 210 or by a plug 264 positioned in the end of the first bore 212 as illustrated in FIGS. 2A and 2B. The first rod 222 of the first double-acting cylinder 220 extends through a hole in the closed end 260 of the first bore 212. An O-ring or other sealing device (not shown) may be provided to seal the first rod 222 and the hole in the closed end 260. The open end 262 of the first bore 212 fluidly couples the first bore 212 with the second bore 214. The open end 262 first bore 212 may open directly into the second bore 214 as depicted in FIGS. 2A and 2B, or may be connected by a fluid passage to the second bore 212.

The second bore 214 includes a closed end 270 and an open end 272. A portion of the body 210 may form the closed end 270 of the second bore 214, or a plug 274 positioned in the second bore 214 may form the closed end 270 in the manner shown in FIGS. 2A and 2B. The second rod 232 of the second double acting cylinder 230 extends through a hole in the closed end 270 of the second bore 214. The second rod 232 may sealingly engage the closed end 270 by way of an O-ring or other sealing device (not shown). The open end 262 of the second bore 214 fluidly couples the second bore 214 with the first bore 212. The open end 272 may open directly into the first bore 212 as depicted in FIGS. 2A and 2B, or may be connected by a liquid passage (not shown) to first bore 212.

The third bore 216 includes a first open end 280 in fluid communication with the first bore 212, and a second open end 282 in fluid communication with the second bore 214. FIGS. 2A and 2B show that the first and second open ends 280, 282 open directly into the first and second bores 212, 214, respectively. In one embodiment, the first and second open ends 280, 282 may be connected via respective liquid passages to the first and second bores 212, 214. The third bore 216 fluidly couples a portion of the first bore 212 bounded by the closed end 260 and the first piston 224 and a portion of the second bore 214 bounded by the closed end 270 and the second piston 234.

The first bore 212 extends along the first axis A1 and guides the first double-acting cylinder 220 along the first axis A1. The second bore 214 extends along the second axis A2 and thus guides the second double-acting cylinder 230 along the second axis A2. The first and second axes A1 and A2 form an angle α. The first and second axes A1 and A2 illustrated in FIGS. 2A and 2B are orthogonal to each other so that the angle α is equal to approximately (e.g., ±10%) 90 degrees. The angle α can be any angle between 0-180 degrees, excluding exactly 0 degrees and 180 degrees, such that the first and second axes A1 and A2 are non-parallel to each other. The first and second double-acting pistons 220, 230 operate in substantially the same way regardless of the angle α. Accordingly, the motion conversion device 200 can be implemented in a variety of different applications having different dimensional constraints.

A bleed valve 286 is provided to vent pressure from the first, second and/or third bores 212, 214, 216. The bleed valve 286 may provide a means to vent contaminant gas trapped in the first, second and/or third bores 212, 214, 216. Although FIGS. 2A and 2B illustrate a single bleed valve 286 attached to the first bore 212, multiple bleed valves may be provided to vent various portions of the bores 212, 214, 216.

The linear actuator 240 provides the force necessary to move the first double-acting cylinder 220 back-and-forth along the first axis A1. The linear actuator 240 includes an actuator stem 241 that is removably coupled to the first rod 222 by a connector 245 (e.g., a nut). The linear actuator 240 may include a motorized device such as an electric motor. A programmable controller may be connected to the electric motor to control the output of the linear actuator 240, and thereby control the position of the first double-acting cylinder 220. In one embodiment, the linear actuator 240 is a handle manually operable by a user. The linear actuator 240 may be partially (or entirely) positioned within the first bore 212 or the linear actuator 240 may be exterior to the first bore 212 as illustrated in FIGS. 2A and 2B.

In one embodiment, the linear actuator 240 may be a spring-and-diaphragm actuator, in which a force of a hydraulic pressure inside a casing 243 pushes against a diaphragm (not shown) to oppose a biasing force provided by a spring (not shown). The linear actuator 240 may be a direct acting actuator such that the actuator stem 241 extends toward the body 210 as the hydraulic pressure on the diaphragm increases. Alternatively, the linear actuator 240 may be a reverse acting actuator such that the actuator stem 241 retracts way from the body 210 as the hydraulic pressure on the diaphragm increases. In another embodiment, the linear actuator 240 may be a double-acting piston actuator which supplies separate hydraulic pressures to either side of an actuator piston (not shown) inside the casing 243 to create a pressure differential that selectively moves the actuator stem 241 toward and away from the body 210.

The embodiment of the motion conversion device 200 illustrated in FIGS. 2A and 2B is configured so that the travel distance of the first double-acting cylinder 220 is generally equal to the travel distance of the second double-acting cylinder 230. Accordingly, the ratio of movement between the first and second double-acting cylinders 220, 230 is approximately (e.g., ±10%) 1:1. This movement ratio is a result of the first diameter D1 of the first piston 224 being the same, or substantially the same, as the second diameter D2 of the second piston 226. Other ratios of movement can be achieved by changing the relative sizes of the first and second diameters D1, D2. The first diameter D1 can be made larger than the second diameter D2 so that the distance traveled by the second double-acting cylinder 230 is greater than the distance traveled by the first double-acting cylinder 220. Alternatively, the first diameter D1 can be made smaller than the second diameter D2 so that the distance traveled by the second double-acting cylinder 230 is less than the distance traveled by the first double-acting cylinder 220. In one embodiment, a regulator (not shown) may be provided to regulate different volumes of the fluid.

The liquid or gas filling the bores 212, 214, 216 can be any liquid or gas, and can be a liquid or gas commonly utilized in the cylinder arts. For example, the liquid may be a hydraulic liquid such as oil. The liquid may be incompressible to help ensure that little or no motion is lost between the first double-acting cylinder 220 and the second double-acting cylinder 230. If the bores are to be filled with gas, nitrogen may be used.

The following describes the operation of the motion conversion device 200. FIG. 2A illustrates the motion conversion cylinder 200 during a ram down operation. Here, the actuator 240 moves the first double-acting cylinder 220 along the first axis A1 in the downward direction. The first end surface 226 of the first piston 224 pushes the liquid or gas in the first bore 212 into the second bore 214. This in turn causes the liquid or gas in the second bore 214 to push against the first end surface 236 of the second piston 234. The shaded arrows in FIG. 2A represent the movement of the liquid or gas during the ram down operation. The liquid or gas exerts pressure against the first end surface 236 of the second piston 234 and thus causes the second double-acting cylinder 230 to move to the right in FIG. 2A along the second axis A2.

FIG. 2B illustrates the motion conversion device during a ram up operation. Here, the actuator 240 moves the first double acting cylinder 220 along the first axis A1 in the upward direction. The second end surface 228 of the first piston 224 pushes liquid or gas in the first bore 212 into the third bore 216. As a result, the liquid or gas in the third bore 216 is displaced into the second bore 214. This in turn pushes the liquid or gas in the second bore 214 into the second end surface 238 of the second piston 234. The shaded arrows in FIG. 2B represent the movement of the liquid or gas during the ram up operation. The liquid or gas exerts pressure against the second end surface 238 of the second piston 234 and thus causes the second double-acting cylinder 230 to move leftwards in FIG. 2B along the second axis A2.

In the ram down operation and the ram up operation, the first double-acting cylinder 230 hydraulically or pneumatically pushes the second double-acting cylinder 240 along the second axis A2. The liquid or gas in the bores 212, 214, 216 converts the movement of the first double-acting cylinder 220 along the first axis A1 into movement of the second double-acting cylinder 230 along the second axis A2. The distance traveled by the first piston 224 is approximately (e.g., ±10%) equal to the distance traveled by the second piston 234, resulting in a 1:1 movement ratio. Other movement ratios (e.g., 1:2 or 2:1 ratio) can be implemented by making the diameters of the first and second pistons 224, 234 different.

Figure 3:
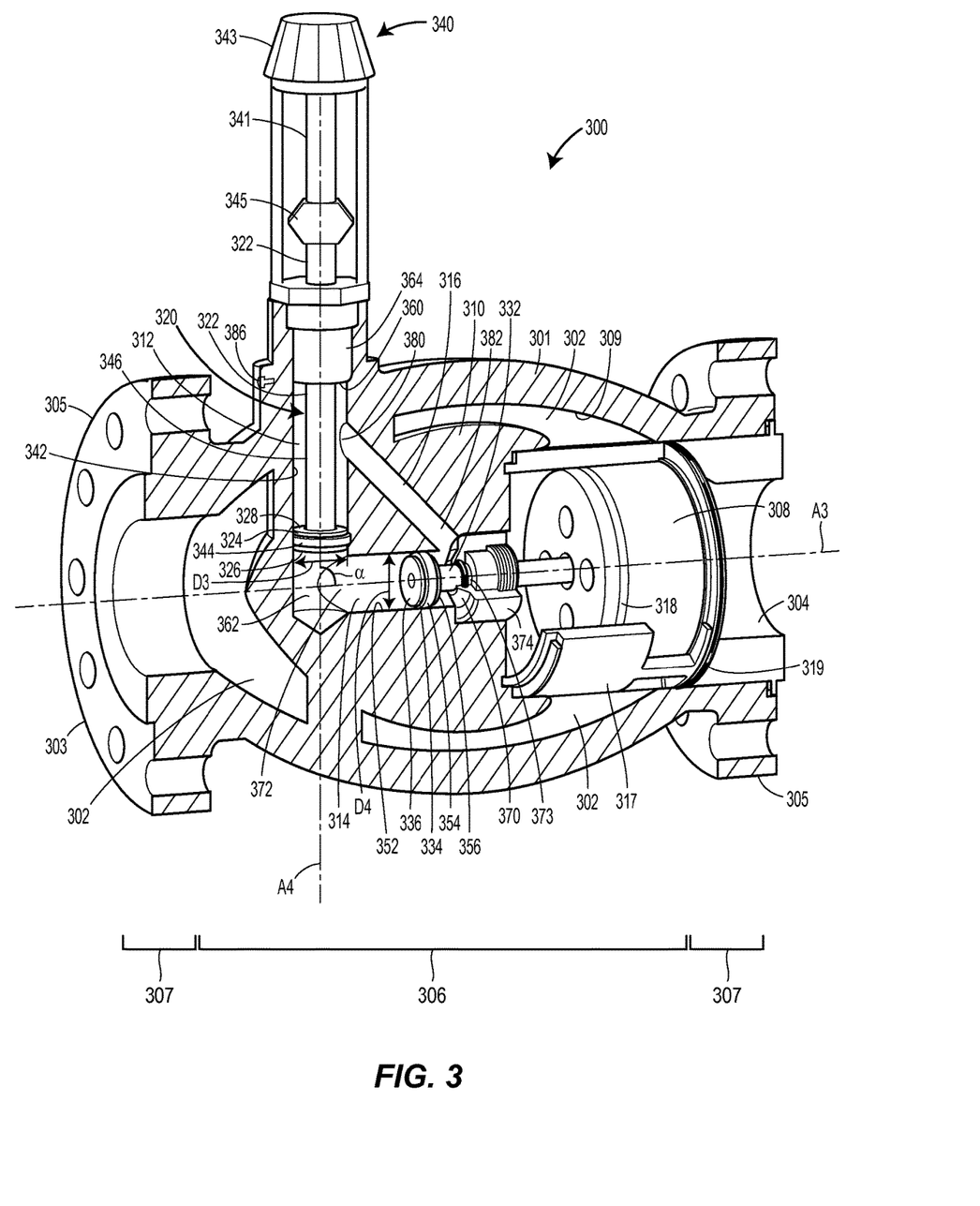
FIG. 3 is a cutaway view of an axial flow valve 300 incorporating two double-acting cylinders 320, 330 for opening and closing the axial flow valve 300.

The above-described motion conversion device can be implemented in a variety of different applications including, but not limited to, an axial flow valve. Axial flow valves are commonly employed in industrial applications such as oil and natural gas pipelines, chemical pipelines, water pipelines, etc. FIG. 3 illustrates a cutaway view of an axial flow valve 300 incorporating a motion conversion device similar to that described above. The axial flow valve 300 includes a valve body 301 having a flow passage 302 extending along a longitudinal axis A3 between an inlet 303 and an outlet 304. The ends of the valve body 302 may include connectors 305 for securing the axial flow valve 300 to a pipeline (not shown). The flow passage 302 includes a large diameter portion 306 and a small diameter portion 307. A closure member or plug 308 is positioned in the large diameter portion 306 of the flow passage 302. The closure member 308 is movable along the longitudinal axis A3 between a closed position and an open position. In the closed position (FIG. 3), the closure member 308 sealingly engages an interior surface 309 of the valve body 301 surrounding the flow passage 302, and thereby obstructs the flow of fluid through the axial flow valve 300. In the open position (not shown), the closure member 308 is retracted along the longitudinal axis A3 so that the closure member 308 no longer contacts the interior surface 309 of the valve body 301. This allows fluid to flow freely through the flow passage 302.

An actuator 340 provides the power for moving the closure member 306 along the longitudinal axis A3. The actuator 340 is exterior to the flow passage 302 and generates translational movement along an axis A4 which is angled relative to the longitudinal axis A3. To convert the movement along axis A4 into movement along longitudinal axis A3, a motion conversion device is provided. The motion conversion device includes a housing 310 that encloses a first bore 312, a second bore 314 and a third bore 316. The housing 310 is positioned in the large diameter portion 305 of the flow passage 302. The fluid in the flow passage 302 flows around the housing 310 when passing through the large diameter portion 306 of the flow passage 302. The exterior surface of the housing 310 is shaped to reduce flow resistance. For example, the housing 310 may possess the shape of a prolate spheroid (i.e., a football shape) with a tip of the prolate spheroid pointing toward the inlet 303 of the axial flow valve 300.

The housing 310 includes a hollow cylindrical extension 317 extending along the longitudinal axis A3 toward the outlet 304. The hollow cylindrical extension 317 houses the closure member 308, which may also possess a cylindrical shape. An O-ring 318 is wrapped around the closure member 308 to sealingly and slidably engage the closure member 308 and an interior surface of the hollow cylindrical extension 317. Another O-ring 319 may be wrapped around the closure member 308 adjacent the end of the closure member 308 facing the outlet 304 to create a seal between the closure member 308 and the interior surface 309 of the valve body 301 when the closure member 308 is arranged in the closed position.

The first, second and third bores 312, 314 and 316 form a closed circuit within the housing 310. A first double-acting cylinder 320 is positioned in the first bore 312 and a second double-acting cylinder 330 is positioned in the second bore 314. The first double-acting cylinder 320 moves along the axis A4, and the second double-acting cylinder 330 moves along the longitudinal axis A3. The second double-acting cylinder 330 and the second bore 314 are coaxial with the longitudinal axis A3 of the flow passage 302. In some embodiments, the second double-acting cylinder 330 moves along an axis offset from the longitudinal axis A3.

The first double-acting cylinder 320 is driven along the axis A4 by the actuator 340. A hydraulic liquid or gas, different from the fluid flowing through the flow passage 302, fills the first, second and third bores 312, 314, 316. The first double-acting cylinder 320 acts as a ram that pushes the hydraulic liquid or gas against the second double-acting cylinder 330. This causes the second double-acting cylinder 330 to move along the longitudinal axis A3. The second double-acting cylinder 330 is connected to the closure member 308 such that movement of the second double-acting cylinder 330 results in movement of the closure member 308.

The first double-acting cylinder 320 includes a first rod 322 aligned along the axis A4 and a first piston 324. The first rod 322 and the first piston 324 may be formed in one piece or formed as separate components attached by a threaded connection, for example. The first piston 324 may be shaped as a cylinder and possess a diameter of D3. The first piston 324 possesses first and second end surfaces 326, 328 facing in opposite directions. The first end surface 326 pushes the hydraulic liquid or gas in the first bore 312 when the first double-acting cylinder 320 is driven by the actuator 340 in the downward direction in FIG. 3. The second end surface 328 of the first head 324 pushes the hydraulic liquid or gas in the first bore 312 when the actuator 340 drives the first double-acting cylinder 320 in the upward direction in FIG. 3. The cylinder 320 is a double-acting cylinder because the cylinder 320 employs the first and second end surfaces 326, 328 to push the hydraulic liquid or gas in the first bore 312 in opposite directions.

The first piston 324 sealingly and slidably engages a circumferential surface 342 of the first bore 312. This is accomplished by, for example, an O-ring 344 wrapped around a circumferential surface 346 of the first piston 224. The circumferential surface 346 may include an annular groove for holding the O-ring 344. In one embodiment, the first piston 324 includes multiple O-rings 344 positioned in multiple, respective annular grooves. The O-ring 344 inhibits the passage of liquid or gas around the first piston 324. This enables the first piston 324 to create a positive pressure on one side of the first piston 324 and a negative pressure on the other side of the first piston 324, and vice versa.

The second double-acting cylinder 330 possesses a similar arrangement as the first double-acting cylinder 320. The second double-acting cylinder 330 includes a first rod 332 aligned along the longitudinal axis A3 and a second piston 334. The first rod 332 and the second piston 334 may be attached, for example, by a threaded connection or they can be formed in one piece as a unitary structure. The second piston 334 may possess a cylindrical shape and have a diameter of D4. Opposite ends of the second head 334 include first and second end surfaces 336, 338. The first end surface 336 is pushed by the liquid or gas in the second bore 314 when the first double-acting cylinder 320 is driven in the downward direction in FIG. 3. The second end surface 338 is pushed by the liquid or gas in the second bore 314 when the first double-acting cylinder 320 is driven in the upward direction in FIG. 3. The cylinder 330 is a double-acting cylinder because the first and second end surfaces 336, 338 allow the cylinder 330 to be pushed in opposite directions.

The second piston 334 sealingly and slidably engages a circumferential surface 352 of the second bore 314. An O-ring 354 may be provided to sealingly and slidably engage the second piston 334 and the circumferential surface 352 of the second bore 314. The O-ring 354 may be positioned in an annular groove in a circumferential surface 356 of the second piston 334. In one embodiment, the second piston 334 includes multiple annular grooves, each holding a respective O-ring 254. The O-ring inhibits the passage of the hydraulic liquid or gas around the second piston 334, and thereby permits a pressure differential to exist across the second piston 334.

The housing 310 and the valve body 301 illustrated in FIG. 3 are formed in one piece as a unitary structure. The housing 310 and the valve body 301 may also be formed as separate, removably connected components. The housing 310 may not be a single block of material as shown in FIG. 3. The housing 310 may include several removably connected elements, with each element housing one of the bores 312, 314 and 316.

The first bore 312 includes a closed end 360 and an open end 362. The closed end 360 may be formed by a portion of the body 310 or by a plug 364 positioned in the end of the first bore 312. The first rod 322 of the first double-acting cylinder 320 extends through a hole in the closed end 320 of the first bore 312. An O-ring (not shown) may be provided to seal the first rod 322 and the hole in the closed end 360. The open end 362 of the first bore 312 fluidly couples the first bore 312 with the second bore 314. The open end 362 of the first bore 312 may open directly into the second bore 314 as depicted in FIG. 3, or may be connected by a fluid passage to the second bore 312.

The second bore 314 includes a closed end 370 and an open end 372. A portion of the body 310 may form the closed end 370 of the second bore 314, or a plug 374 positioned in the second bore 314 may form the closed end 370 as shown in FIG. 3. The second rod 332 of the second double acting cylinder 330 extends through a hole in the closed end 370 of the second bore 314 and attaches to the closure member 308. The second stem 332 may be removably attached to the closure member 308. The second rod 323 may sealingly engage the closed end 370 by way of an O-ring 373. The open end 362 of the second bore 314 liquidly couples the second bore 314 with the first bore 312. The open end 372 of the second bore 314 may open directly into the first bore 312 as FIG. 3, or may be connected by a liquid passage (not shown) to first bore 312.

The third bore 316 includes a first open end 380 in fluid communication with the first bore 312, and a second open end 382 in fluid communication with the second bore 314. FIG. 3 shows that the first and second open ends 380, 382 open directly into the first bore 312 and the second bore 314, respectively. In one embodiment, the first and second open ends 380, 382 may be connected via respective liquid passages to the first and second bores 312, 314. The third bore 316 liquidly couples a portion of the first bore 312 bounded by the closed end 360 and the first piston 324 and a portion of the second bore 314 bounded by the closed end 370 and the second piston 334.

The axes A3 and A4 illustrated in FIG. 3 are orthogonal to each other so that the angle α is equal to approximately (e.g., ±10%) 90 degrees. The angle α, however, can be any angle between 0-180 degrees. The first and second double-acting cylinders 320, 330 operate in substantially the same way regardless of the angle α.

A bleed valve 386 is provided to vent pressure from the first, second and/or third bores 312, 314, 316. The bleed valve 386 may provide a means to vent contaminant gas trapped in the first, second and/or third bores 312, 314, 316. FIG. 3 illustrates a single bleed valve 386 attached to the first bore 312, but other bleed valves may also be provided to vent bores 314, 316.

The linear actuator 340 provides the force necessary to move the first double-acting cylinder 320 back-and-forth along the first axis A4. The linear actuator 340 may include an actuator stem 341 that is removably coupled to the first rod 322 by a connector 345 (e.g., a nut). The linear actuator 340 may include a motorized device such as an electric motor. A programmable controller may be connected to the electric motor to control the output of the linear actuator 340, and thereby control the position of the first double-acting cylinder 320. In one embodiment, the linear actuator 340 is a handle manually operable by a user. For example, the linear actuator 340 could be a wheel that can be rotated by the user. The linear actuator 340 may be partially (or entirely) housed within the first bore 312, or the actuator 340 may be outside the first bore 312 as illustrated in FIG. 3.

In one embodiment, the linear actuator 340 may be a spring-and-diaphragm actuator, in which a force of a hydraulic pressure inside a casing 343 pushes against a diaphragm (not shown) to oppose a biasing force provided by a spring (not shown). The linear actuator 340 may be a direct acting actuator such that the actuator stem 341 extends toward the body 310 as the hydraulic pressure on the diaphragm increases. Alternatively, the linear actuator 340 may be a reverse acting actuator such that the actuator stem 341 retracts way from the body 310 as the hydraulic pressure on the diaphragm increases. In another embodiment, the linear actuator 340 may be a double-acting piston actuator which supplies separate hydraulic pressures to either side of an actuator piston (not shown) inside the casing 343 to create a pressure differential that selectively moves the actuator stem 341 toward and away from the housing 310.

The embodiment of the motion conversion device illustrated in FIG. 3 is configured so that the travel distance of the first double-acting cylinder 320 is generally equal to the travel distance of the second double-acting cylinder 330. Accordingly, the ratio of movement between the first and second double-acting cylinders 320, 330 is approximately (e.g., ±10%) 1:1. This movement ratio is a result of the diameter D3 of the first piston 324 being the same, or substantially the same, as the diameter D4 of the second piston 326. Other ratios of movement can be implemented by changing the relative sizes of the first and second diameters D3, D4. The diameter D3 can be made larger than the diameter D4 so that the distance traveled by the second double-acting cylinder 330 is greater than the distance traveled by the first double-acting cylinder 320. Alternatively, the diameter D3 can be made smaller than the diameter D4 so that the distance traveled by the second double-acting cylinder 330 is less than the distance traveled by the first double-acting cylinder 320. In one embodiment, a regulator may be provided to regulate different volumes of the fluid.

The hydraulic liquid or gas filling the bores 312, 314, 316 can be any liquid or gas, and can be a liquid or gas commonly utilized in the piston arts. For example, the liquid may be a hydraulic liquid such as oil. The liquid may be incompressible to help ensure that little or no motion is lost between the first double-acting cylinder 320 and the second double-acting cylinder 330. If the bores are to be filled with gas, nitrogen may be used.

Figure 4A:
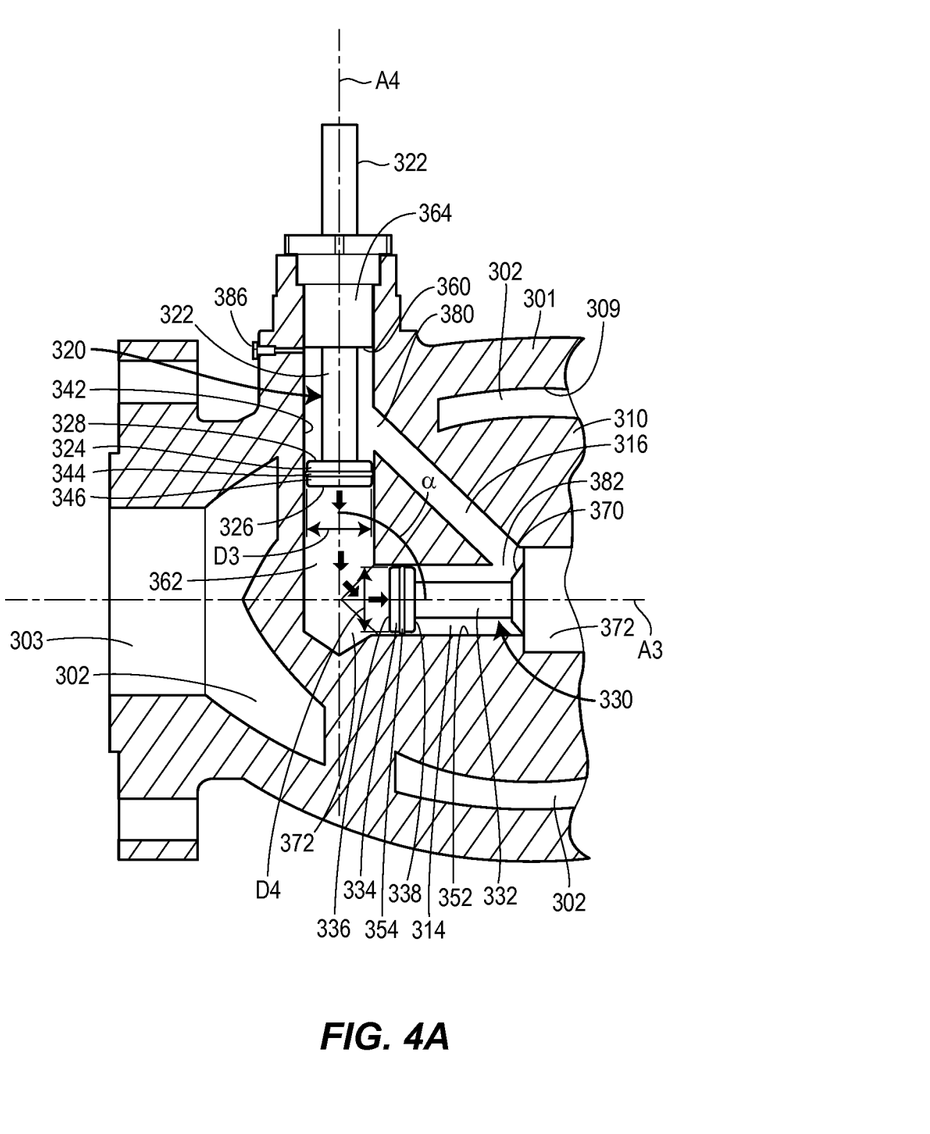
FIG. 4A depicts a cross-sectional view of the axial flow valve 300 of FIG. 3 at the onset of a ram down operation to close the axial flow valve 300.
Figure 4B:
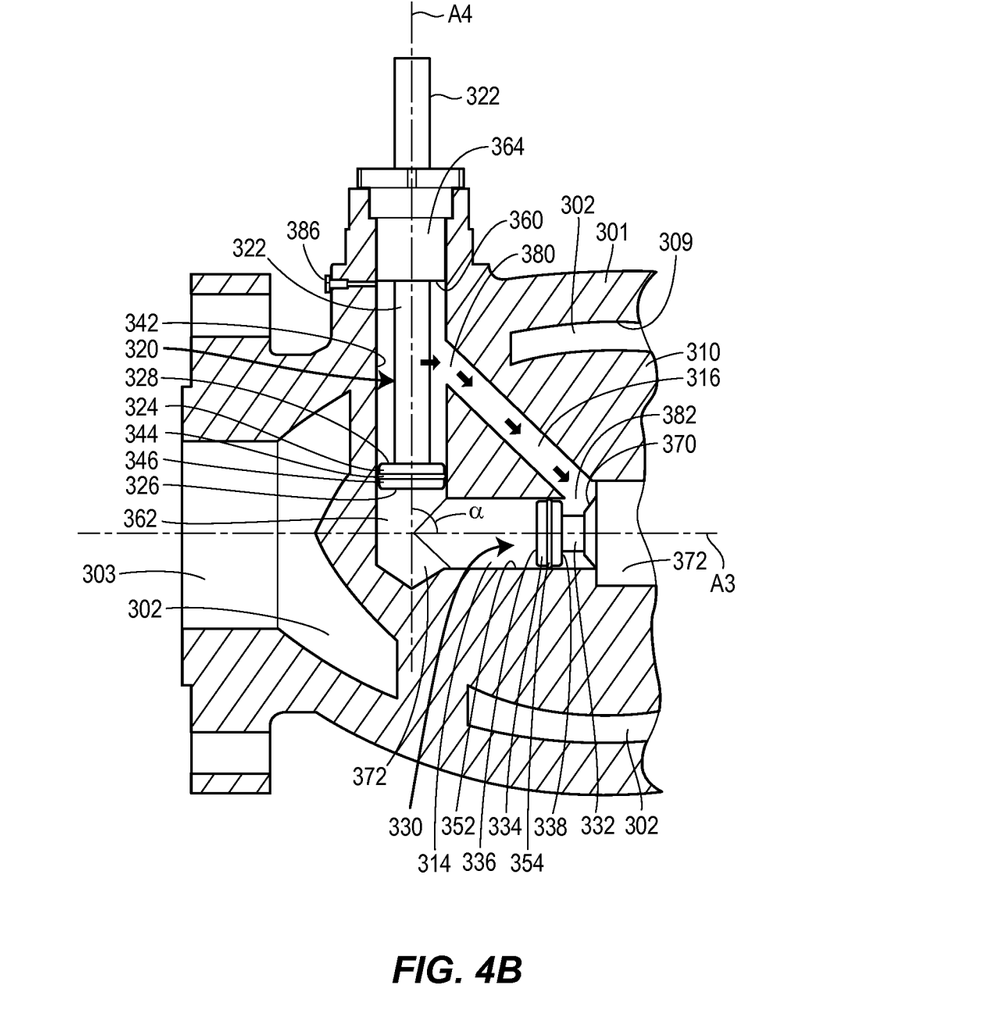
FIG. 4B is a cross-sectional view of the axial flow valve 300 of FIG. 3 at the onset of a ram up operation to open the axial flow valve 300.

The operation of the first and second double-acting cylinders 320, 330 is similar to the operation of the first and second double-acting cylinders 220, 230 described above. The above description regarding the operation of the first and second double-acting cylinders 220, 230 thus applies equally to the operation of the first and second double-acting cylinders 320, 330. FIGS. 4A and 4B illustrate cross-sections of the valve 300 depicted in FIG. 3. The linear actuator 340 is omitted from FIGS. 4A and 4B for the sake of clarity and may be implemented in the same manner as shown and discussed above with reference to FIG. 3. FIG. 4A illustrates a ram down operation of the first double-acting cylinder 320 that corresponds to the ram down operation illustrated in FIG. 2A. The movement of the second double-acting cylinder 330 in FIG. 4A moves the closure member 308 from the open position to the closed position. FIG. 4B illustrates a ram up operation of the first double-acting cylinder 320 similar to the ram up operation illustrated in FIG. 2B. The movement of the second double-acting cylinder 330 in FIG. 4B moves the closure member 308 from the closed position to the open position.

Compared to the housing 155 of the known axial flow valve 100 illustrated in FIG. 1, the housing 310 of the axial flow valve 300 is smaller. This is because the housing 310 does not require an enlarged rear end to accommodate a gear or other mechanism that protrudes toward the valve inlet when the closure member is in the open position. A smaller housing reduces material and manufacturing costs, and also reduces the flow resistance caused by the housing. The double-acting cylinder arrangement of the axial flow valve 300 also does not require meshingly engaging gears, teeth or threads that tend to wear down over time. Accordingly, the axial flow valve 300 may require less maintenance and may have a longer operating life than known axial flow valves.

While the foregoing embodiments of the motion conversion device include a pair of double-acting cylinders arranged in a closed hydraulic circuit, alternative embodiments can be configured differently, for example, with one or more single-acting cylinders hydraulically coupled to a double-acting cylinder. In such alternative embodiments, a closed hydraulic circuit may not be required to operate the cylinders. Therefore, the vacuum pressure forces typically associated with moving cylinders in a closed hydraulic circuit may be avoided, or at least inhibited. 1:1 motion between the driving cylinder and the driven cylinder may be easier to achieve in the absence of such vacuum pressure forces. Described below in more detail are embodiments of a motion conversion device omitting a closed hydraulic circuit.

Figure 5A:
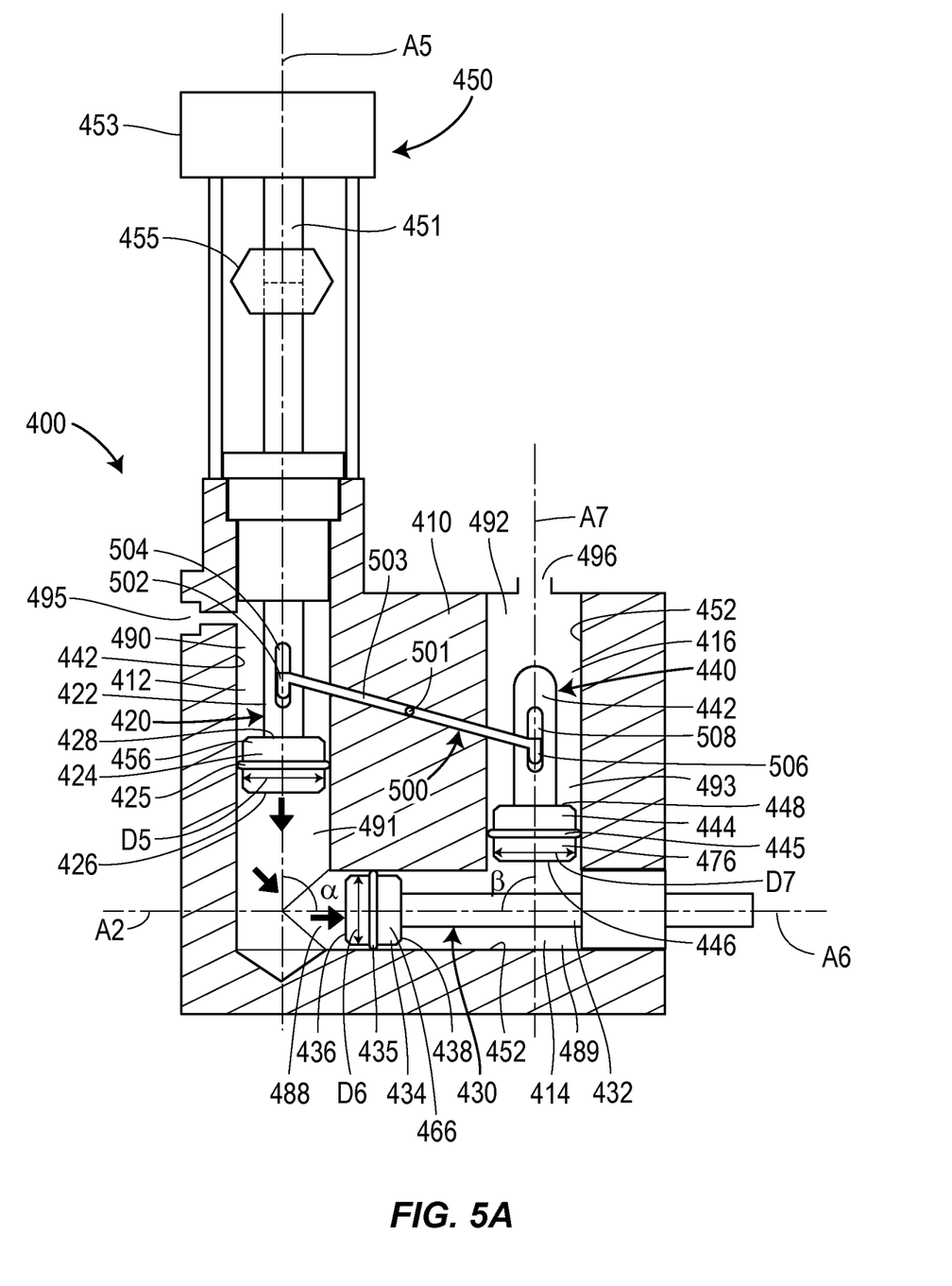
FIG. 5A is a cross-sectional view of another embodiment of a motion conversion device 400, during a ram down operation.
Figure 5B:
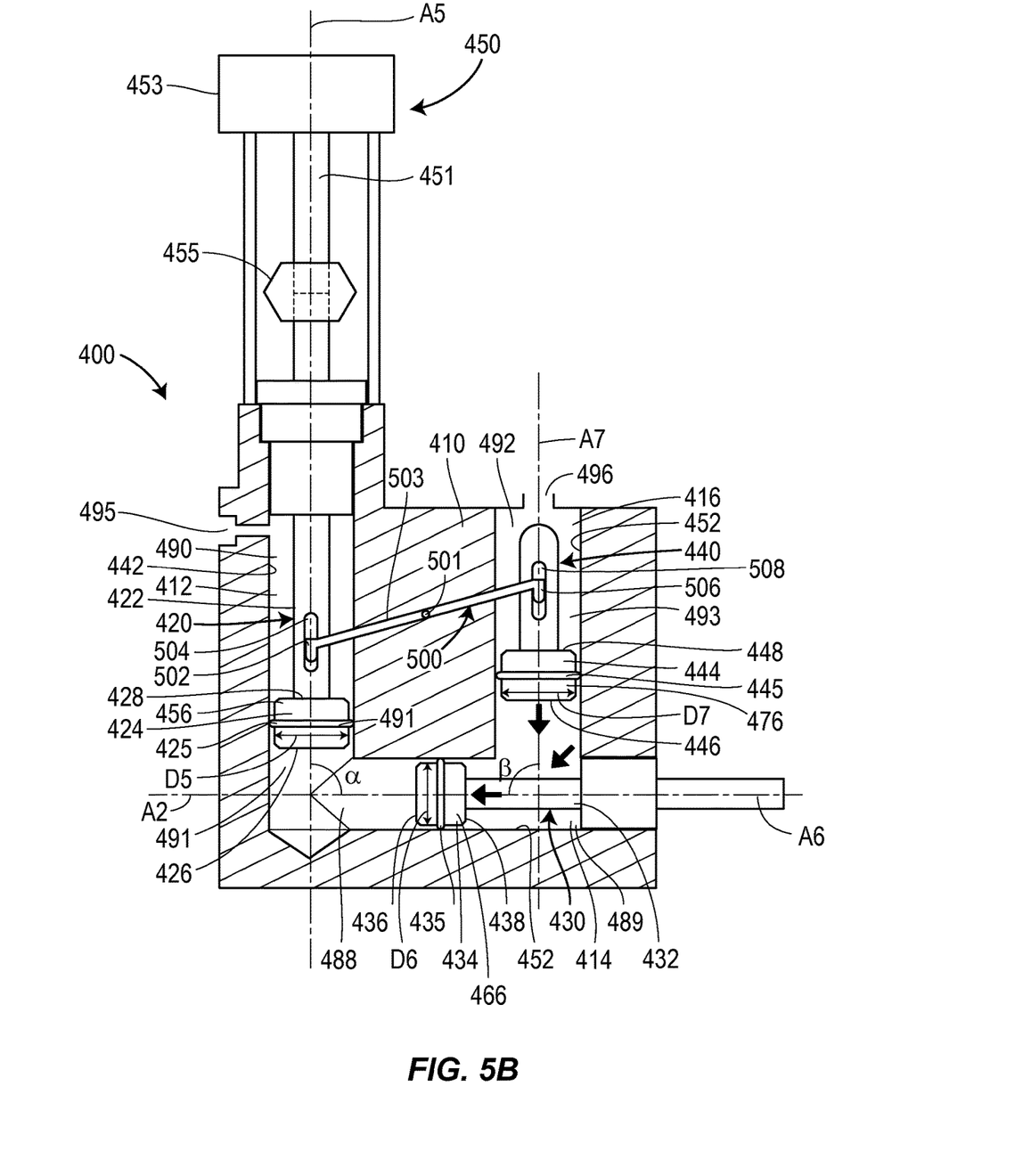
FIG. 5B is a cross-sectional view of the motion conversion device 400, during a ram up operation.

FIGS. 5A and 5B illustrate a motion conversion device 400 including a pair of single-acting cylinders, each being hydraulically coupled to a double-acting cylinder to drive the double-acting cylinder in a reciprocal motion along an axis that is non-parallel to either of the axes of the single-acting cylinders. Accordingly, the motion conversion device 400 converts motion along one axis (e.g., the axis of one or both of the single-acting cylinders) into motion along a different axis (e.g., the axis of the double-acting cylinder). As described below in more detail, the single-acting cylinders may be mechanically coupled to each other by, for example, a rotatable link member so that movement of one of the single-acting cylinders in one direction causes movement of the other one of the single-acting cylinders in an opposite direction. Mechanically coupling the single-acting cylinders in this manner reduces the likelihood of lost motion to operation of the motion conversion device 400. Moreover, mechanically coupling the single-acting cylinders enables the use of a single actuator to drive both of the single-acting cylinders. Also, the use of two single-acting cylinders to drive reciprocal motion of the double-acting cylinder eliminates the need for a closed hydraulic circuit between the cylinders. Accordingly, the vacuum pressure forces oftentimes associated with a closed hydraulic circuit may be avoided, and 1:1 motion between the cylinders can be achieved.

Referring to FIG. 5A, the motion conversion device 400 includes a body 410 with a first bore 412, a second bore 414 and a third bore 416. The first and third bores 412 and 416 are in fluid communication with the second bore 414, but not with each other. Thus, unlike the embodiments of the motion conversion device described above in connection with FIGS. 1-4, the bores 412, 414 and 416 of the motion conversion device 400 may not form a closed hydraulic circuit. As described below, the first and third bores 412 and 416 are in fluid communication with opposite ends of the second bore 414, such that the first and third bores 412 and 416 supply hydraulic pressure to opposite sides of a piston of a double-acting cylinder arranged in the second bore 414, thereby enabling reciprocal motion of the double-acting cylinder.

A single-acting cylinder 420 is positioned in the first bore 412, a double-acting cylinder 430 is positioned in the second bore 414, and a single-acting cylinder 440 is positioned in the third bore 416. The single-acting cylinder 420 moves reciprocates along a first axis A5, the double-acting cylinder 430 reciprocates along a second axis A6, and the single-acting cylinder 440 reciprocates along the third axis A7. The single-acting cylinder 420 is driven along the first axis A5 by an actuator 450. A first liquid (e.g., a hydraulic liquid) or gas fills a portion of the first bore 412 and a portion of the second bore 414 located between the single-acting cylinder 420 and the double-acting cylinder 430. A second liquid (e.g., a hydraulic liquid) or gas fills a portion of the second bore 414 and a portion of the third bore 416 located between the single-acting cylinder 440 and the double-acting cylinder 430. The first liquid or gas may be compositionally the same, or different, as the second liquid or gas.

In general, the single-acting cylinder 420 functions as a ram that pushes the first liquid or gas against a side of the double-acting cylinder 430 to cause the double-acting cylinder 430 to move along the second axis A6 in a direction away from the first axis A5 (i.e., toward the third axis A7). The single-acting cylinder 440 functions as another ram that pushes the second liquid or gas against an opposite side of the double-acting cylinder 430 to cause the double-acting cylinder 430 to move along the second axis A6 in a direction away from the third axis A7 (i.e., toward the first axis A5).

The single-acting cylinder 420 includes a rod 422 aligned along the first axis A5 and a piston 424. The rod 422 and the piston 424 may be formed in one piece or formed as separate components attached by a threaded connection, for example. The rod 422 may be coupled to a linear actuator 450. The piston 424 may be cylindrically-shaped and possess a diameter D5. The piston 424 also may possess first and second end surfaces 426 and 428 facing in opposite directions. As shown in FIG. 5A, the first end surface 426 pushes the liquid or gas in the first bore 412 when the single-acting cylinder 420 is driven by the linear actuator 450 in the downward direction. The cylinder 420 is a single-acting cylinder because the cylinder 420 employs only the first end surface 426 to displace the liquid or gas in the first bore 412.

The piston 424 sealingly and slidably engages a circumferential surface 452 of the first bore 412. This is accomplished by, for example, an O-ring 425 wrapped around a circumferential surface 456 of the piston 424. The circumferential surface 456 may include an annular groove for holding the O-ring 454. In one embodiment, the piston 424 includes multiple O-rings 425 positioned in multiple, respective annular grooves. The O-ring 425 inhibits the passage of liquid or gas past the piston 424.

The single-acting cylinder 440 is configured in a similar manner as the single-acting cylinder 420, except that the single-acting cylinder 440 is not connected directly to the actuator 450. The single-acting cylinder 440 includes a rod 442 aligned along a third axis A7 and a piston 444. The rod 442 and the piston 444 may be formed in one piece or formed as separate components attached by a threaded connection, for example. The piston 444 may be cylindrically-shaped and possess a diameter of D7. The piston 444 possesses first and second end surfaces 446 and 448 which face in opposite directions. The first end surface 446 pushes the liquid or gas in the third bore 416 when the single-acting cylinder 440 is driven in the downward direction, as depicted in FIG. 5B. The cylinder 440 is a single-acting cylinder because the cylinder 440 employs only the first end surface 446 to displace the liquid or gas in the third bore 416. In alternative embodiments (not illustrated), the second single-acting cylinder 440 may include more two or more pistons arranged along the third axis A7.

The piston 444 sealingly and slidably engages a circumferential surface 472 of the third bore 416. This is accomplished by, for example, an O-ring 445 wrapped around a circumferential surface 476 of the piston 444. The circumferential surface 476 may include an annular groove for holding the O-ring 445. In one embodiment, the piston 444 includes multiple O-rings 445 positioned in multiple, respective annular grooves. The O-ring 445 inhibits the passage of liquid or gas past the piston 444.

The double-acting cylinder 430 includes a rod 432 aligned along the second axis A6 and a piston 434. The rod 432 and the piston 434 may be attached, for example, by a threaded connection or they can be formed in one piece as a unitary structure. The piston 434 may possess a cylindrical shape and have a diameter D6. Opposite ends of the piston 434 include first and second end surfaces 436 and 438. The first end surface 436 is pushed by the first liquid or gas in the second bore 414 when the single-acting cylinder 420 is driven in the downward direction as shown in FIG. 5A. The second end surface 438 is pushed by the second liquid or gas in the second bore 414 when the single-acting cylinder 440 is driven in the downward direction in the manner shown in FIG. 5B. The cylinder 430 is a double-acting cylinder because the first and second end surfaces 436 and 438 allow the double-acting cylinder 430 to be pushed in opposite directions.

The piston 434 sealingly and slidably engages a circumferential surface 462 of the second bore 414. An O-ring 435 may be provided to sealingly and slidably engage the piston 434 and the circumferential surface 462 of the second bore 414. The O-ring 435 may be positioned in an annular groove in a circumferential surface 466 of the second piston 434. In one embodiment, the second piston 434 includes multiple annular grooves, each holding a respective O-ring 435. The O-ring inhibits the passage of liquid or gas past the second piston 434, and thereby allows a pressure differential to exist across the second piston 434.

The first, second and third bores 412, 414 and 416 are each machined from or cast into a single block of material (i.e., the body 410). In an alternative embodiment, the bores 412, 414 and 416 are formed as separate components. The second bore 414 includes a first end 488 in fluid communication with the first bore 412 and a second end 489 in fluid communication with the third bore 416. The piston 434 of the double-acting cylinder 430 is movably arranged between the first and second ends 488 and 489 of the second bore 414. The first bore 412 includes a first end 490 vented to the atmosphere (e.g., via port 495) and a second end 491 in fluid communication with the first end 488 of the second bore 414. The third bore 416 includes a first end 492 vented to the atmosphere (e.g., via port 496) and a second end 493 in fluid communication with the second end 489 of the second bore 414. Venting the first end 490 of the first bore 412 and/or the first end 492 of the third bore 416 to the atmosphere may prevent or inhibit vacuum pressure forces from building inside the motion conversion device 400. Accordingly, it may be possible to achieve 1:1 movement between the cylinders 420, 430 and 440, or at least between the single-acting cylinder 420 and the double-acting cylinder 430.

FIGS. 5A and 5B show that the first and second ends 492 and 493 of the third bore 416 open directly into the first and second bores 412 and 414, respectively. In alternative embodiments, the first and second ends 492 and 493 may be connected via respective fluid passages (e.g., hydraulic lines) to the first and second bores 412 and 414.

The first bore 412 extends along the first axis A5 and guides the single-acting cylinder 420 along the first axis A5. The second bore 414 extends along the second axis A6 and thus guides the double-acting cylinder 430 along the second axis A6. The third bore 416 extends along the third axis A7 and thus guides the single-acting cylinder 440 along the third axis A7.

The first and second axes A5 and A6 form an angle $\alpha$. The first and second axes A5 and A6 illustrated in FIGS. 5A and 5B are orthogonal to each other so that the angle $\alpha$ is equal to approximately (e.g., ±10%) 90 degrees. The angle $\alpha$ can be any angle between 0-180 degrees, excluding exactly 0 degrees and 180 degrees, such that the first and second axes A5 and A6 are non-parallel to each other.

The second and third axes A6 and A7 form an angle $\beta$. The second and third axes A6 and A7 illustrated in FIGS. 5A and 5B are orthogonal to each other so that the angle $\alpha$ is equal to approximately (e.g., ±10%) 90 degrees. The angle $\beta$ can be any angle between 0-180 degrees, excluding exactly 0 degrees and 180 degrees, such that the second and third axes A6 and A7 are non-parallel to each other.

As illustrated in FIGS. 5A and 5B, the first and third axes A5 and A7 may be parallel to each other, and orthogonal to the second axis A6. In other embodiments, depending on the mechanical coupling between the single-acting cylinder 420 and the single-acting cylinder 440, the first and third axes A5 and A7 may be non-parallel to each other.

The linear actuator 450 provides the force necessary to move the single-acting cylinder 420 back-and-forth along the first axis A5. The linear actuator 450 includes an actuator stem 451 that is removably coupled to the rod 422 by a connector 455 (e.g., a nut). The linear actuator 450 may be powered by an electric motor. A programmable controller may be connected to the electric motor to control the output of the linear actuator 450, and thereby control the position of the single-acting cylinder 420. In one embodiment, the linear actuator 450 includes a handle enabling a person to manually operate the linear actuator 450. The linear actuator 450 may be partially (or entirely) positioned within the first bore 412 or the linear actuator 450 may be arranged exterior to the first bore 412, as illustrated in FIGS. 5A and 5B.

In some embodiments, the linear actuator 450 may be a spring-and-diaphragm actuator, in which a force of a hydraulic or pneumatic pressure inside a casing 453 pushes against a diaphragm (not shown) to oppose a biasing force provided by a spring (not shown). The linear actuator 450 may be a direct acting actuator such that the actuator stem 451 extends toward the body 410 as the hydraulic or pneumatic pressure on the diaphragm increases. Alternatively, the linear actuator 450 may be a reverse acting actuator such that the actuator stem 451 retracts way from the body 410 as the hydraulic or pneumatic pressure on the diaphragm increases. In yet another embodiment, the linear actuator 450 may be a double-acting piston actuator which supplies separate hydraulic or pneumatic pressures to either side of an actuator piston (not shown) inside the casing 453 to create a pressure differential that selectively moves the actuator stem 451 toward and away from the body 410.

The motion conversion device 400 is configured so that the travel distance of the single-acting cylinder 420 is generally equal to the travel distance of the double-acting cylinder 430 and the single-acting cylinder 440. Accordingly, the ratio of movement between the single-acting cylinder 420 and the double-acting cylinder 430 is approximately (e.g., ±10%) 1:1. Also, the ratio of movement between the single-acting cylinder 440 and the double-acting cylinder 430 is approximately (e.g., ±10%) 1:1. Furthermore, the ratio of movement between the single-acting cylinder 420 and the single-acting cylinder 440 may be equal to approximately (e.g., ±10%) 1:1.

The 1:1 movement ratios are, in part, the result of the diameters D5, D6 and D7 of the pistons 424, 434 and 444 being the same, or substantially the same. In alternative embodiments, movement ratios different from 1:1 can be achieved by changing the relative sizes of the diameters D5, D6 and D7. For example, the diameter D5 of the piston 424 and the diameter D7 of the piston 444 can be made larger than the diameter D6 of the piston 434 so that the distance traveled by the double-acting cylinder 430 is greater than the distance traveled by the single-acting cylinder 420 or the single-acting cylinder 440. Alternatively, the diameter D5 of the piston 424 and the diameter D7 of the piston 444 can be made smaller than the diameter D6 of the piston 434 so that the distance traveled by the double-acting cylinder 430 is smaller than the distance traveled by the single-acting cylinder 420 or the single-acting cylinder 440.

As mentioned above, the single-acting cylinder 420 is mechanically coupled to the single-acting cylinder 440 such that movement of the single-acting cylinder 420 in one direction causes movement of the single-acting cylinder 440 in an opposite direction. FIGS. 5A and 5B illustrate that the single-acting cylinders 420 and 440 are mechanically coupled by a rotatable link member 500. The rotatable link member 500 may rotate about a pivot 501 having a rotational axis arranged halfway between the first axis A5 and the third axis A7.

Movement of the single-acting cylinder 420 toward the second axis A6 (i.e., a ram down operation) may cause the single-acting cylinder 420 to rotate the rotatable link member 500 in a counter-clockwise direction. Counter-clockwise rotation of the rotatable link member 500 may in turn pull the single-acting cylinder 440 in a direction away from the second axis A5. Also, movement of the single-acting cylinder 420 toward the second axis A6 may exert hydraulic or pneumatic pressure on the double-acting cylinder 430, thereby moving it in a first direction along the second axis A6. In an embodiment where the double-acting cylinder 430 is connected to a valve closure member, such as the closure member or plug 308 illustrated in FIG. 3, movement of the double-acting cylinder 430 in the first direction may move the closure member to the open position.

By contrast, movement of the single-acting cylinder 420 away from the second axis A6 (i.e., a ram up operation) may cause the single-acting cylinder 420 to rotate the rotatable link member 500 in a clockwise direction. Clockwise rotation of the rotatable link member 500 may push the single-acting cylinder 440 in a direction toward from the second axis A5. Movement of the single-acting cylinder 440 toward the second axis A6 may exert hydraulic or pneumatic pressure on the double-acting cylinder 430, thereby moving it in a second direction (opposite the first direction) along the second axis A6. In an embodiment where the double-acting cylinder 430 is connected to a valve closure member, such as the closure member or plug 308 illustrated in FIG. 3, movement of the double-acting cylinder 430 in the second direction may move the closure member to the closed position.

Accordingly, the single-acting cylinders 420 and 440 and the rotatable link member 500 work together to provide reciprocal motion of the double-acting cylinder 430 and any other structure attached to the double-acting cylinder 430.

While the rotatable link member 500 of the present embodiment is formed by a single elongate bar having a single axis of rotation, in alternative embodiments, a plurality of rotatable link members may be used to mechanically couple the single-acting cylinder 420 to the single-acting cylinder 440. The plurality of rotatable link members may be linked together and/or each rotate about its own respective rotational axis. Moreover, one or more of the rotatable link members may have a rotational axis that translates as the rotatable link member rotates.

In some embodiments, slack may exist in the connection between the rotatable link member 500 and the single-acting cylinder 420 so that there is a delay between movement of the single-acting cylinder 420 and movement of the single-acting cylinder 440. For example, in the embodiment illustrated in FIGS. 5A and 5B, a first end 502 of the rotatable link member 500 is slidably received in a slot 504 in the single-acting cylinder 420. The slot 504 is larger than the first end 502 of the rotatable link member 500. Therefore, when the single-acting cylinder 420 initially moves in the downward direction toward the second axis A6, the first end 502 of the rotatable link member 500 may slide along the walls of the slot 504. Accordingly, the single-acting cylinder 420 initially may not rotate the rotatable link member 500. It may not be until the first end 502 of the rotatable link member 500 slides into an end wall of the slot 504 that the single-acting cylinder 420 begins to rotate the rotatable link member 500. This arrangement helps ensure that the single-acting cylinder 440 is not moved by the rotatable link member 500 prior to the double-acting cylinder 430 pushing the second liquid or gas in the third bore 416. Accordingly, the piston 444 of the single-acting cylinder 440 may remain in contact with the surface of the second liquid or gas in the third bore 416. Vacuum pressure forces therefore may be prevented or inhibited.

Additionally, or alternatively, a second slot 508 may be formed in the single-acting cylinder 440 to slidably receive a second end 506 of the rotatable link member 500. The second slot 508 may be larger than the second end 506 of the rotatable link member 500. Similar to the interaction between the first end 502 of the rotatable link member 500 and the first slot 504, the second end 506 of the rotatable link member 500 may slide along the second end 506 during initial movement single-acting cylinder 440 until the second end 506 reaches an end wall of the second slot 508. This may also help prevent or inhibit vacuum pressure forces.

As illustrated in FIGS. 5A and 5B, the first end 502 of the rotatable link member 500 may protrude away from a middle portion 503 of the rotatable link member 500 in a direction toward the second axis A6 along the first axis A5. Additionally, or alternatively, the first end 502 of the rotatable link member 500 may protrude away from a middle portion 503 of the rotatable link member 500 in a direction away from the second axis A6 along the first axis A5. Said in a another way, the first end 502 of the rotatable link member 500 may be elongated in a direction towards and/or away from the second axis A6.

Similarly, as depicted in FIGS. 5A and 5B, the second end 506 of the rotatable link member 500 may protrude away from the middle portion 503 of the rotatable link member 500 in a direction toward the second axis A6 along the third axis A7. Additionally, or alternatively, the second end 506 of the rotatable link member 500 may protrude away from the middle portion 503 of the rotatable link member 500 in a direction away from the second axis A6 along the third axis A7. Said in another way, the second end 506 of the rotatable link member 500 may be elongated in a direction towards and/or away from the second axis A6.

Set forth below is a description of a ram down operation (FIG. 5A) and a ram up operation (FIG. 5B). During the ram down operation shown in FIG. 5A, the actuator 450 moves the double-acting cylinder 420 along the first axis A5 in the downward direction. As a result, the first end surface 426 of the piston 424 may push the first liquid or gas in the first bore 412 into the second bore 414. This in turn causes the liquid or gas in the second bore 414 to push against the first end surface 436 of the piston 434. The shaded arrows in FIG. 5A represent the movement of the first liquid or gas during the ram down operation. The first liquid or gas exerts pressure against the first end surface 436 of the piston 434, thereby causing the double-acting cylinder 430 to move to the right in FIG. 5A. In an embodiment where the double-acting cylinder 430 is connected to a valve closure member, such as the closure member or plug 308 illustrated in FIG. 3, this movement of the double-acting cylinder 430 may cause the valve closure member to move to the open position.

Movement of the double-acting cylinder 430 during the ram down operation may cause the second end surface 438 of the piston 434 to push the second fluid or gas in the second bore 414 into the third bore 416. The second fluid or gas therefore may push the single-acting cylinder 440 in the upward direction along the third axis A7. Since the first end 492 of the third bore 416 is vented to the atmosphere via port 496, little or no backpressure should restrict movement of the single-acting cylinder 440 in the upward direction.

Also during the ram down operation, the single-acting cylinder 420 may rotate the rotatable link member 500 in a counter-clockwise direction, which in turn may pull the single-acting cylinder 440 in the upward direction along the third axis A7. In embodiments where a sliding slot connection exists between the first end 502 of the rotatable link member 500 and the single-acting cylinder 420 (see above), rotation of the rotatable link member 500 relative to the start of downward movement of the single-acting cylinder 420 may be delayed. This may help ensure that the single-acting cylinder 440 does not begin to move in the upward direction before the level of the second fluid or gas in the third bore 416 begins to rise. Therefore, it may be possible to maintain contact between the second fluid or gas in the third bore 416 and the first end surface 446 of the piston 444, which reduces the likelihood of vacuum pressure forces.

During the ram up operation illustrated in FIG. 5B, the actuator 450 moves the single-acting cylinder 420 along the first axis A5 in the upward direction. As a result, the single-acting cylinder 420 rotates the rotatable link member 500 in the clockwise direction. In embodiments where a sliding slot connection exists between the first end 502 of the rotatable link member 500 and the single-acting cylinder 420 (see above), rotation of the rotatable link member 500 relative to the start of upward movement of the single-acting cylinder 420 may be delayed.

Clockwise rotation of the rotatable link member 500 may push the single-acting cylinder 440 in the downward direction toward the second axis A6. As a result, the first end surface 446 of the piston 444 may push the second liquid or gas in the third bore 416 into the second bore 414 to push against the second end surface 438 of the piston 434. The shaded arrows in FIG. 5B represent the movement of the second liquid or gas during the ram up operation. The second liquid or gas exerts pressure against the second end surface 438 of the piston 434, thereby causing the double-acting cylinder 430 to move the left in FIG. 5B. In an embodiment where the double-acting cylinder 430 is connected to a valve closure member, such as the closure member or plug 308 illustrated in FIG. 3, this movement of the double-acting cylinder 430 may cause the valve closure member to move to the closed position.

While the motion conversion device described in connection with FIGS. 5A and 5B employs a rotatable link member to transfer translational motion of one of the single-acting cylinders to the other one of the single-acting cylinders, in alternative embodiments, a rotatable link member may be omitted. Instead, each of the single-acting cylinders may be driven by its own respective actuator, so that the motion conversion device employs at least two actuators. When one of the actuators drives one of the single-acting cylinders in the downward direction, the other one of the actuators drives the other one of the single-acting cylinder in the upward direction, and vice versa.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A valve comprising:
   a valve body including a flow passage;
   a closure member movable between a closed position preventing fluid flow through the flow passage and an open position permitting fluid flow through the flow passage;
   a first bore in fluid communication with a second bore;
   a third bore in fluid communication with the second bore;
   a first single-acting cylinder movable within the first bore along a first axis;
   a double-acting cylinder coupled to the closure member and movable within the second bore along a second axis;
   a second single-acting cylinder movable within the third bore along a third axis;
   the second axis being non-parallel to the first axis and the third axis;
   the first single-acting cylinder being configured to exert hydraulic or pneumatic pressure on a side of the double-acting cylinder to move the double-acting cylinder along the second axis in a direction that moves the closure member to one of the closed position and the open position; and
   the second single-acting cylinder being configured to exert hydraulic or pneumatic pressure on an opposite side of the double-acting cylinder to move the double-acting cylinder along the second axis in an opposite direction to move the closure member to the other one of the closed position and the open position;
   the first single-acting cylinder being mechanically coupled to the second single-acting cylinder such that (i) movement of the first single-acting cylinder toward the second axis causes movement of the second single-acting cylinder away from the second axis, and (ii) movement of the first single-acting cylinder away from the second axis causes movement of the second single-acting cylinder toward the second axis.

2. The valve of claim 1, comprising:
   the double-acting cylinder including a piston and a rod, the rod extending between the piston and the closure member; and
   the first bore being in fluid communication with a first end of the second bore, the third bore being in fluid communication with a second end of the second bore, the piston of the double-acting cylinder being arranged between the first and second ends of the second bore.

3. The valve of claim 1, the first axis being parallel to the third axis.

4. The valve of claim 1, comprising an actuator configured to move the first single-acting cylinder along the first axis.

5. The valve of claim 1, the first single-acting cylinder being mechanically coupled to the second single-acting cylinder by at least one rotatable link member.

6. The valve of claim 5, the third bore including a first end in fluid communication with the second bore and a second end vented to the atmosphere.

7. The valve of claim 5, comprising a slot formed in the first single-acting cylinder and configured to slidably receive an end of the at least one rotatable link member.

8. The valve of claim 5, the at least one rotatable link member having a rotational axis arranged between the first axis and the third axis.

9. A motion conversion device for use with a control valve, the motion conversion device comprising:
   a first bore in fluid communication with a second bore;
   a first hydraulic cylinder comprising a first rod and a first piston movable within the first bore along a first axis;
   a second hydraulic cylinder comprising a second rod and a second piston movable within the second bore along a second axis, the first axis being non-parallel to the second axis;
   the first hydraulic cylinder being hydraulically coupled to the second hydraulic cylinder such that movement of the first hydraulic cylinder along the first axis causes movement of the second hydraulic cylinder along the second axis;
   a third bore in fluid communication with the second bore; and
   a third hydraulic cylinder comprising a third rod and a third piston movable within the third bore along a third axis, the third hydraulic cylinder being hydraulically coupled to the second hydraulic cylinder and mechanically coupled to the first hydraulic cylinder;

the first hydraulic cylinder being mechanically coupled to the third hydraulic cylinder such that: (i) movement of the first hydraulic cylinder toward the second axis causes movement of the third hydraulic cylinder away from the second axis, and (ii) movement of the first hydraulic cylinder away from the second axis causes movement of the third hydraulic cylinder toward the second axis.

10. The motion conversion device of claim 9, the first hydraulic cylinder being a single-acting cylinder, the second hydraulic cylinder being a double-acting cylinder, and the third hydraulic cylinder being a single-acting cylinder.

11. The motion conversion device of claim 9, the third bore including a first end in fluid communication with the second bore and a second end vented to the atmosphere.

12. The motion conversion device of claim 11, the first axis being parallel to the third axis.

13. The motion conversion device of claim 9, the first hydraulic cylinder being mechanically coupled to the third hydraulic cylinder by at least one rotatable link member.

14. The motion conversion device of claim 13, the at least one rotatable link member having a rotational axis arranged between the first axis and the third axis.

15. The motion conversion device of claim 13, comprising a slot formed in the first hydraulic cylinder and configured to slidably receive an end of the at least one rotatable link member.

16. A method for operating a valve, comprising:
moving a first single-acting cylinder along a first axis to exert hydraulic or pneumatic pressure on a side of a double-acting cylinder to move the double-acting cylinder along a second axis to close the valve;
moving a second single-acting cylinder along a third axis to exert hydraulic or pneumatic pressure on an opposite side of the double-acting cylinder to move the double-acting cylinder along the second axis to open the valve;
wherein the first single-acting cylinder is mechanically coupled to the second single-acting cylinder such that moving the first single-acting cylinder along the first axis causes the second single-acting cylinder to move in a direction away from the second axis, and (ii) moving the second single-acting cylinder along the third axis causes the first single-acting cylinder to move in a direction away from the second axis; and
wherein the second axis is non-parallel to the first axis and the third axis.

17. The method of claim 16, the first single-acting cylinder being mechanically coupled to the second single-acting cylinder by a rotatable link member.

18. A valve comprising:
a valve body including a flow passage;
a closure member movable between a closed position preventing fluid flow through the flow passage and an open position permitting fluid flow through the flow passage;
a first bore in fluid communication with a second bore;
a third bore in fluid communication with the second bore;
a first single-acting cylinder movable within the first bore along a first axis;
a double-acting cylinder coupled to the closure member and movable within the second bore along a second axis;
a second single-acting cylinder movable within the third bore along a third axis;
the first axis being parallel to the third axis;
the second axis being non-parallel to the first axis and the third axis;
the first single-acting cylinder being configured to exert hydraulic or pneumatic pressure on a side of the double-acting cylinder to move the double-acting cylinder along the second axis in a direction that moves the closure member to one of the closed position and the open position; and
the second single-acting cylinder being configured to exert hydraulic or pneumatic pressure on an opposite side of the double-acting cylinder to move the double-acting cylinder along the second axis in an opposite direction to move the closure member to the other one of the closed position and the open position.

19. A motion conversion device for use with a control valve, the motion conversion device comprising:
a first bore in fluid communication with a second bore;
a first hydraulic cylinder comprising a first rod and a first piston movable within the first bore along a first axis;
a second hydraulic cylinder comprising a second rod and a second piston movable within the second bore along a second axis, the first axis being non-parallel to the second axis;
the first hydraulic cylinder being hydraulically coupled to the second hydraulic cylinder such that movement of the first hydraulic cylinder along the first axis causes movement of the second hydraulic cylinder along the second axis;
a third bore in fluid communication with the second bore, the third bore including a first end in fluid communication with the second bore and a second end vented to the atmosphere; and
a third hydraulic cylinder comprising a third rod and a third piston movable within the third bore along a third axis, the third hydraulic cylinder being hydraulically coupled to the second hydraulic cylinder and mechanically coupled to the first hydraulic cylinder, the first axis being parallel to the third axis.

* * * * *

UNITED STATES PATENT AND TRADEMARK OFFICE
CERTIFICATE OF CORRECTION

PATENT NO. : 9,803,774 B2
APPLICATION NO. : 14/874199
DATED : October 31, 2017
INVENTOR(S) : Matthew Lawrence Gulleen et al.

Page 1 of 1

It is certified that error appears in the above-identified patent and that said Letters Patent is hereby corrected as shown below:

In the Specification

At Column 18, Line 18, "a another" should be -- another --.

Signed and Sealed this
Sixteenth Day of October, 2018

Andrei Iancu
*Director of the United States Patent and Trademark Office*